United States Patent [19]

Neko et al.

[11] Patent Number: 5,028,365

[45] Date of Patent: Jul. 2, 1991

[54] POSITIONING METHOD FOR AN ELECTRICALLY-OPERATED INJECTION MOLDING MACHINE

[75] Inventors: Noriaki Neko; Masao Kamiguchi, both of Yamanashi, Japan

[73] Assignee: Fanuc Ltd., Minamitsuru, Japan

[21] Appl. No.: 457,778

[22] PCT Filed: Jul. 27, 1989

[86] PCT No.: PCT/JP89/00772

§ 371 Date: Jan. 11, 1990

§ 102(e) Date: Jan. 11, 1990

[87] PCT Pub. No.: WO90/01405

PCT Pub. Date: Feb. 22, 1990

[30] Foreign Application Priority Data

Aug. 4, 1988 [JP] Japan .................. 63-193347

[51] Int. Cl.⁵ .................. B29C 45/76
[52] U.S. Cl. .................. 264/40.1; 264/40.5; 425/135; 425/150; 425/162
[58] Field of Search .......... 264/40.1, 40.5, 328.1; 425/135, 139, 145, 149, 150, 161, 162, 165, 166, 167

[56] References Cited

U.S. PATENT DOCUMENTS 4,849,678 7/1989 Kamiguchi et al. .......... 425/150
4,889,667 12/1989 Kojima et al. .......... 264/40.1
4,911,629 3/1990 Fujita .................. 264/40.1

FOREIGN PATENT DOCUMENTS 62-290513 12/1987 Japan .

Primary Examiner—Jill L. Heitbrink
Attorney, Agent, or Firm—Staas & Halsey

[57] ABSTRACT

A method for positioning an operating unit of an electrically-operated injection molding machine at a predetermined operating position in an optimum manner, by using widths of positive-side and negative-side regions of an allowable positioning zone which are set independently of one another in accordance with the operating direction of the operating unit and the function to be achieved by the operating unit. Positioning of a screw at an injection-end position is completed when the actual screw position (PA) is equal to or less than the sum of a target injection-end position (PS) and the positive-side region width (W1), which is set to "0", and is equal to or larger than the value obtained by substracting the negative-side region width (W2) from the target position (PS), so that the screw is positioned at the target injection-end position or a screw-moving position which slightly exceeds the target position by a permissible distance, to thereby actually control an amount of shot.

5 Claims, 3 Drawing Sheets

POSITIONING METHOD FOR AN ELECTRICALLY-OPERATED INJECTION MOLDING MACHINE

TECHNICAL FIELD

The present invention relates to a positioning method for use in an electrically-operated injection molding machine in which servomotors are employed as driving sources for individual axes of the machine.

BACKGROUND ART

Electrically-operated injection molding machines are provided with various operating units including injection units and the like, each of which is driven by one or more servomotors, so as to perform injection molding cycles including an injection process, etc. In each respective process of the injection molding cycle, positioning control for one or more control axes, corresponding to the process, is carried out. For instance, in the final stage of the injection process, positioning control to an injection end position on an injection axis is carried out. To this end, injection molding machines of this kind are provided with servo circuits for individual axes so as to control the drive of the servomotors for these axes. Each of the servo circuits receives a pulse train, indicative of a target motor rotation position and supplied from a numerical control unit, and another pulse train, indicative of an actual motor rotation position and supplied from a position detector mounted on the servomotor concerned, to effect positioning to the target rotation position.

Generally, in order to effect the positioning with a desired accuracy and within a desired setting time, the positioning is completed when the actual motor rotation position falls within an allowable positioning zones having a predetermined width and consisting of positive-side and negative-side regions, which are adjacent to each other with respect to the boundary therebetween where the target rotation position is located. Here, the positive-side region is the portion of the allowable positioning zone which is at the side of the target position that is away from the origin of the coordinate system, which is set for the associated axis for the target position, and the negative-side region is the portion of the zone which is at the side of the target position that is toward the coordinate origin. Conventionally, the width of the positive-side region of the allowable positioning zone and the width of the negative-side region thereof are set to the same value of "W/2", as shown in FIG. 4, wherein the reference symbol W indicates the total width of the allowable positioning zone, and PS indicates the target position.

In certain cases, it is preferable to effect the positioning for each of the control axes in a specific manner which depends on an operating mode of the associated operating unit such as the direction to which the operating unit is operated and the function to be achieved by the operating unit. For instance, in order to effect an injection by which a predetermined amount of shot can be attained, preferably, the injection process should be completed and a shift to the hold process should be made at a screw-moving-position which slightly exceeds the target injection end position. On the other hand, in order to protect a mold of a type which is liable to be damaged when a mold-opening operation is continued even after a predetermined mold-opening stroke is reached, the mold-opening process should preferably be completed at a movable-platen-moving-position that is slightly short of the target mold-opening end position. In other words, if the respective origins of the coordinate systems set for the injection and the mold-clamping axes are located at sides opposite to the directions of injection and mold-clamping, the injection screw should preferably be positioned at a position falling within the negative-side region of the allowable positioning zone associated with the target injection end position, whereas the movable platen should preferably be positioned at a position falling within the positive-side region of the allowable positioning zone associated with the target mold-opening end position.

However, the aforementioned conventional method cannot achieve the positioning of a unit of the machine to a position which arbitrarily is within or the other one of the positive-side and negative-side regions of the allowable positioning zone, although the positioning within this zone can be surely made. In this respect, conventionally, the target position is shifted to either the positive or negative side a distance equal to the half width "W/2" of the allowable positioning zone, where required to accommodate the operating manner of an associated operating unit of the injection molding machine. More specifically, if positioning to a moving position exceeding the target position PS should be made, as with the aforesaid case for shifting from the injection process to the hold process, the target position is set to "PS+W/2", as shown in FIG. 5. On the other hand, if positioning to a moving position short of the target position should be made, as in the case of mold-opening end operation, the target position is set to "PS−W/2", as shown in FIG. 6. In this manner, the respective target positions are shifted, if necessary, to accommodate the operating manner of the associated operating unit. Accordingly, labor is required for preparing the control program. Moreover, positioning accuracy is diminished because the effective width of a corresponding one of the positive-side and negative-side regions of the allowable positioning zone is increased due to the shift of the target position.

DISCLOSURE OF THE INVENTION

The object of the present invention is to provide a method for positioning an operating unit of an electrically-operated injection molding machine, with ease, in an optimum way which is determined in dependence upon an operating condition of the operating unit.

In order to achieve the above-mentioned object, the method of the present invention, whereby a servomotor driven operating unit, of an electrically-operated injection molding machine is positioned within a predetermined allowable positioning zone, comprises the steps of: (a) setting the width of the positive-side region of said allowable positioning zone; and (b) setting the width of the negative-side region of said allowable positioning zone independently of the width of said positive-side region, said negative-side region being adjacent said positive-side region. Preferably, the widths of said positive-side and negative-side regions are each set in dependence upon the operating direction of said operating unit and the function to be achieved by said operating unit.

As mentioned above, according to the present invention, since the widths of the positive-side and negative-side regions of the allowable positioning zone associated with the operation of the operating unit of the electrically-operated injection molding machine, are each set in a manner independently from each other, the positioning of the operating unit can be effected in an optimum manner suitable for the mode in which the operating unit is operated, with reduction of load to an operator or a programmer and with no deterioration in positioning accuracy. In other words, the positioning to an optimum target position can be carried out with optimum positioning accuracy in view of the direction to which the operating unit is operated and the function to be achieved by the operation section.

BEST MODE OF CARRYING OUT THE INVENTION

Figure 2:
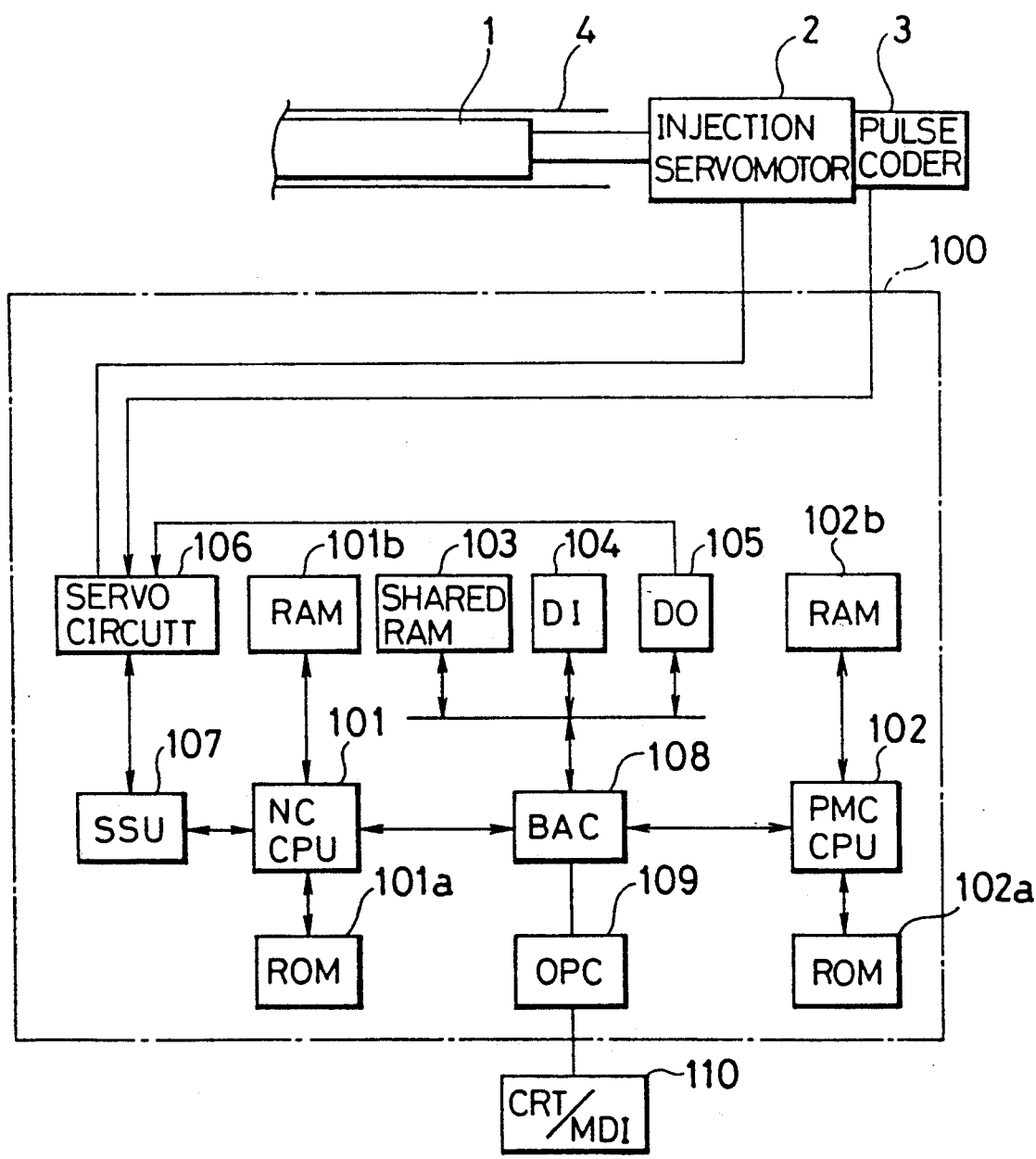
FIG. 2 is a schematic diagram showing the essential parts of an injection molding machine which may be operated according to the method of FIG. 1.

An electrically-operated injection molding machine to which the positioning method according to an embodiment of the present invention is applied, comprises various operating units (not shown) such as an injection unit (mentioned later), a screw rotation unit, a mold-clamping unit, and an eject unit, and the machine is so arranged as to control the drive of these operating units by means of a numerical control unit (hereinafter, referred to as NC unit), mentioned later, and a programmable machine controller (not shown). Referring to FIG. 2, the injection unit includes an injection servomotor 2 having a pulse coder 3 and which is operable to axially drive a screw 1, disposed within a heating cylinder 4, through a rotary motion/linear motion conversion mechanism (not shown).

The NC unit 100 includes a central processing unit 101 for numerical control (hereinafter, referred to as NCCPU) to which are connected a ROM 101a storing therein a management program for globally controlling the injection molding machine, and a RAM 101b for temporary storage of data. Further, servo circuits (only the servo circuit corresponding to the injection servomotor 2 is shown by numeral 106) for controlling the drive of servomotors of the various operating units are connected to the NCCPU through a servo interface 107. The NC unit 100 further includes a central processing unit 102 for the programmable machine controller (hereinafter, referred to as PMCCPU) to which are connected a ROM 102a storing therein, e.g., a sequence program for controlling a sequence operation of the injection molding machine, and a RAM 102b for temporary storage of data.

Figure 3:
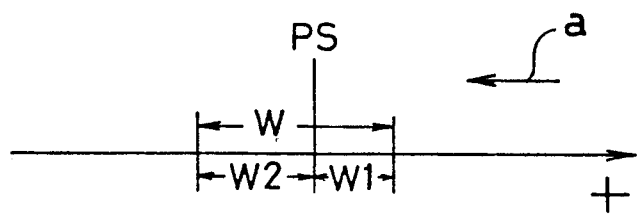
FIG. 3 is a diagram showing, by way of example, an allowable positioning zone, which is set in accordance with the method of FIG. 1.
Figure 4:
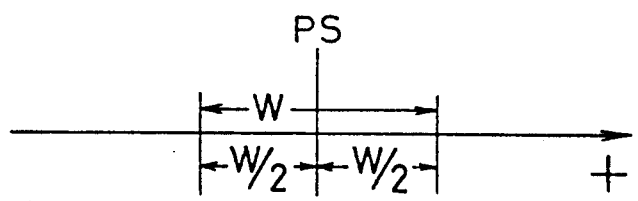
FIG. 4 is a diagram showing, by way of example, an allowable positioning zone set by a conventional positioning method.
Figure 5:
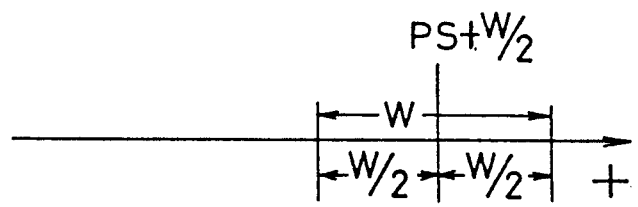
FIG. 5 is a diagram showing another example of an allowable positioning zone set by a conventional method.
Figure 6:
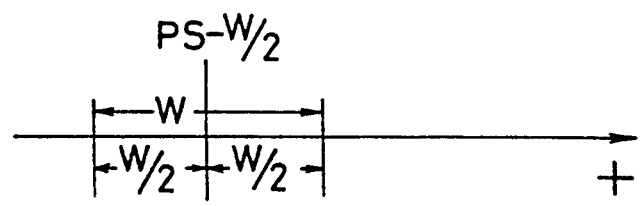
FIG. 6 is a diagram showing still another example of an allowable positioning zone set in accordance with a conventional method.

Reference numeral 103 denotes a non-volatile shared RAM, consisting of a bubble memory, or a CMOS memory or the like, for storing therein an NC program and various molding condition parameters. In the NC program, the respective widths of independently set positive-side and negative-side regions of the allowable positioning zones for each of the individual axes (for various operating units) are stated together with a respective associated target value. Here, the positive-side region of an allowable positioning zone is the portion of the zone which is at the side of the target position that is away from the origin of the coordinate system which is set for the associated control axis for the target position on the same axis, and the negative-side region is the portion of the allowable positioning zones which is at the side of the target position that is toward the coordinate origin. In the example of FIG. 3, the coordinate system of the axis is set in such a manner that the coordinate position (the operating position of an associated operating unit of the injection molding machine) decreases along the direction (shown by arrow a) to which the operating unit is operated. The widths of the positive-side and negative-side regions of the allowable positioning zone are set at "W1" and "W2", respectively. The values W1, W2 are positive or zero, respectively, and the width W of the zone is equal to the sum of W1 and W2. In the present embodiment, the width W1 of the positive-side region of the allowable positioning zone associated with the injection axis is set to "0", so that a shift from the injection process to the hold process is made when the screw 1 reaches the target injection end position or a screw-moving position which slightly exceeds the target injection end position in a direction toward the mold-clamping unit by a permissible distance.

Referring to FIG. 2 again, in the NC unit 100, respective busses of the CPUs 101, 102, the shared RAM 103, an input circuit 104, and an output circuit 105 are connected to a bus arbiter controller (hereinafter, referred to as BAC) 108 which controls the selection of a bus to be enabled during a certain information processing cycle of the NC unit 100. Further, a manual data input device with a CRT display (hereinafter, referred to as CRT/MDI) 110 is connected to BAC 108 through an operator panel controller 109, so that an operator is permitted to operate various operative keys of the CRT/MDI 110 including software keys and ten-key pad, so as to input various control parameters including the molding condition parameters.

The operation of the injection molding machine described above is as follows.

During operation of the injection molding machine, the NCCPU 101 performs the pulse distribution to the servo circuits of associated the operating units of the molding machine through the servo interface 107, and the PMCCPU 102 performs the sequence control for the associated operating units, respectively, in accordance with the NC program and various control parameters stored in the shared RAM 103 and the sequence program stored in the ROM 102a. As a result, the injection molding cycle which consists of a series of processes of mold-opening, mold-closing, mold-clamping, metering, injection, hold, ejection of a molded product, etc. is carried out in basically the same manner as in conventional molding machines.

During the time period in which the pulse distribution operation is performed, each of registers (not shown) accommodated in the servo interface 107 is supplied with a command pulse train from the NCCPU 101 and a feedback pulse train from the pulse coder 3 corresponding to the same register, so that a value indicative of the actual rotation position of the servomotor corresponding to the same register (the actual operating position of the associated operating unit) is stored in the register. The NCCPU 101 periodically reads out the stored values of the respective registers in the servo interface 107, and writes these values into present-value registers (not shown) in the shared RAM 103, respectively, through the BAC 108.

Figure 1:
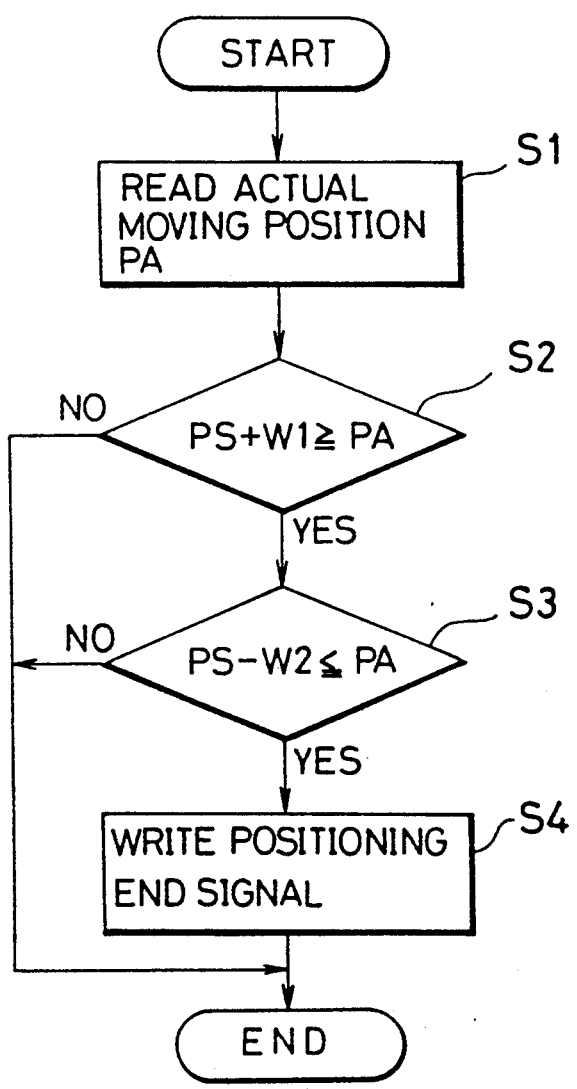
FIG. 1 is a flowchart showing the positioning-end discriminating processing in a positioning method according to an embodiment of the present invention.

The PMCCPU 102 executes positioning-end discriminating processing for the individual axes at predetermined intervals of the cycle. With reference to FIG. 1, the processing for the injection axis, by way of example, will be explained hereinbelow.

After the initiation of the injection process, the PMCCPU 102 reads out the actual present time moving position PA for the injection axis through the BAC 108 from the present-value register for the injection axis in the shared RAM 103 at predetermined intervals during the cycle (step S1), and reads out, from the shared RAM 103, the target injection-end position PS and the widths W1, W2 of the positive-side and negative-side regions of the allowable positioning zone associated therewith, which are stated in the NC program. Whereupon, the PMCCPU determines whether or not the screw 1 has moved to a position falling within the allowable positioning zone, associated with the injection-end position. More specifically, the PMCCPU determines, at step S2, whether or not the value PA is equal to or less than the sum PS+W1 of the target injection-end position PS and the width W1 (=0) of the positive-side region of the allowable positioning zone, and further determines, at step S3, whether or not the value PA is equal to or larger than the value PS-W2 obtained by subtracting the width W2 of the negative-side region of the allowable positioning zone from the value PS.

In case the coordinate system is set for an injection axis as shown in FIG. 3, the actual position PA gradually decreases with advancement of the injection process. During the initial stages of the injection process, the actual value PA is larger than the value PS+W2, and hence the result of the determination at step S2 is negative (NO). In this case, the PMCCPU 202 determines that the positioning of the screw 1 relative to the target injection-end position has not yet been completed, and completes the determination processing of the ongoing cycle: thereafter the PMCCPU 202 performs the same determination in the next determination processing cycle.

When the result of the determination at step S2 becomes affirmative (YES) in a certain discrimination processing cycle, then the PMCCPU determines, at step S3, whether or not the value PA is equal to or larger than the value PS−W2 in the aforementioned manner. Ordinally, the result of the determination at step S3 is affirmative. In this case, the PMCCPU 102 determines that the screw 1 has reached the target injection-end position or a moving position which slightly exceeds the target position, and then generates a positioning-end signal into the shared RAM 103 (step S4), to complete the discrimination processing for the injection-end position. In response to the generation of the positioning-end signal, the injection process is completed. This results in a suitable shot whose amount is accurately controlled. Whereupon the hold process is entered.

On the other hand, whenever the PMCCPU determines that the positioning of the screw 1 to the injection-end position has not yet been completed due to the presence of overshoot in controlling the drive of the screw 1, for instance, so long as the result of the determination at step S3 is negative even when the determination result of step S2 is affirmative, the present determination processing cycle is completed and the processing of FIG. 1 is repeated in the next determination processing cycle. Thereafter, the determination result at step S3 becomes affirmative, and then the processing advances to the aforesaid step S4.

Positioning for other control axes of the injection molding machine is effected in the same manner as described above. For instance, in a case where the injection molding machine is equipped with a mold of a type which is liable to be damaged if the mold-opening operation is continued over a stroke larger than a predetermined mold-opening stroke, the width of a corresponding one of the positive-side and negative-side regions of the allowable positioning zone associated with the mold-opening-end position of the mold-clamping unit is set to "0", so that the mold-opening operation is completed at the target mold-opening-end position or a movable-platen-moving position slightly short of the target position, to thereby protect the mold.

The present invention is not limited to the foregoing embodiment, and various modifications thereof may be made. For instance, although the positioning widths W1, W2 are included in the NC program in the foregoing embodiment, the positioning widths W1, W2 may be stored in a predetermined storage region of the shared RAM 103 in response to a manual operation of a keyboard of the CRT/MDI 110 for setting the positioning widths, so that these stored values W1, W2 may be referred to during the positioning-end discrimination processing. Further, the discrimination of completion of positioning may be made on the basis of an actual position error, although, in the embodiment, such discrimination is effected on the basis of target position PS, actual position PA and positioning widths W1, W2. In this case, the absolute value of the actual position error, which error is stored in a position error register provided in a servo circuit or a servo interface and then transferred to and stored in the shared RAM, is compared with each of the positioning widths W1, W2, and completion of the positioning is determined when the absolute value of the actual position error is less than both of the positioning widths.

We claim:

1. A method for positioning a servomotor driven operating unit of an electrically-operated injection molding machine within a predetermined allowable positioning zone of an operating position, said method comprising the steps of:
   (a) setting the width of the positive-side region of said allowable positioning zone; and
   (b) setting the width of the negative-side region of said allowable positioning zone independently of the width of said positive-side region, said negative-side region being adjacent said positive-side region.

2. A positioning method according to claim 1, wherein said widths of said positive-side and negative-side regions are each set in dependence upon the operating direction of said operating unit and the function to be achieved by said operating unit.

3. A positioning method according to claim 1, wherein is included the step of:
   stating the widths of said positive-side and negative-side regions of said allowable positioning zone in a control program together with a target position associated with said allowable positioning zone.

4. A positioning method according to claim 1, wherein is included the step of:

storing set values of said widths of said positive-side and negative-side regions of said allowable positioning zone into a memory of the injection molding machine in a manner such that said values are readable from said memory in response to a manual setting of said set values.

5. A positioning method according to claim 1, wherein is included the step of:

completing the positioning of said operating unit in the operating position therefor when it is determined that the actual operating position of said operating unit is within said allowable positioning zone on the basis of said actual operating position, the target operating position, and said widths of said positive-side and negative-side regions of said allowable positioning zone.

* * * * *

UNITED STATES PATENT AND TRADEMARK OFFICE
CERTIFICATE OF CORRECTION

PATENT NO. : 5,028,365
DATED : July 2, 1991
INVENTOR(S) : NORIAKI NEKO and MASAO KAMIGUCHI It is certified that error appears in the above-identified patent and that said Letters Patent is hereby corrected as shown below:

Column 1, line 36, "zones" should be --zone--.

Column 2, line 16, "within or the other one" should be
    --wherein one or the other--;

Column 4, line 35, "busses" should be --buses--;
    line 52, "of associated the" should be
    --of the associated--.

Column 5, line 47, "cycle: thereafter" should be
    --cycle. Thereafter--.

Signed and Sealed this

First Day of December, 1992

*Attest:*

DOUGLAS B. COMER

*Attesting Officer*      *Acting Commissioner of Patents and Trademarks*